Aug. 23, 1932.  W. McCLINTOCK ET AL  1,873,445
APPARATUS FOR MAKING INTERLOCKING MULTIPLE DUCT CONDUITS
Filed Aug. 2, 1929  4 Sheets-Sheet 1
Fig. 1.
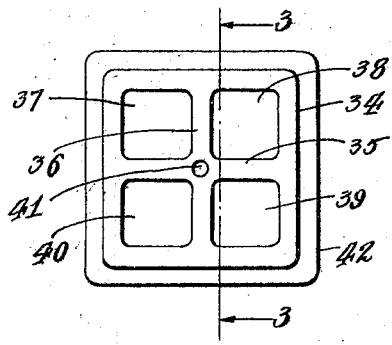
Fig. 2.
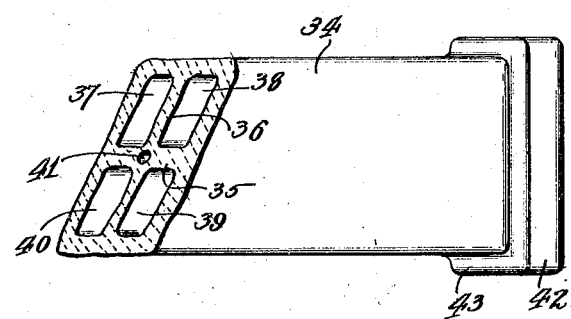
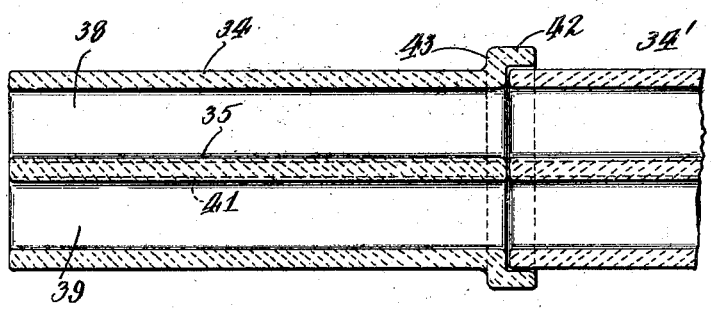
Fig. 3.
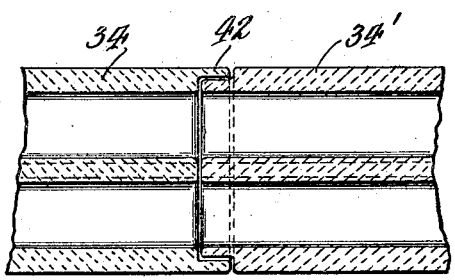
Fig. 4.
Inventors
William McClintock
Roy Lacy
By
Lyon & Lyon  Attorneys Aug. 23, 1932.  W. McCLINTOCK ET AL  1,873,445
APPARATUS FOR MAKING INTERLOCKING MULTIPLE DUCT CONDUITS
Filed Aug. 2, 1929  4 Sheets-Sheet 2
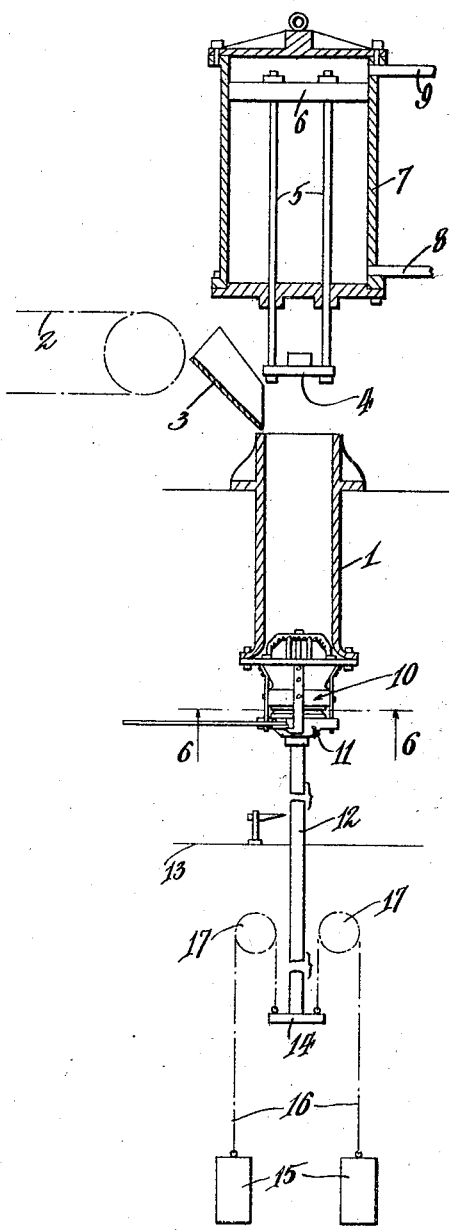
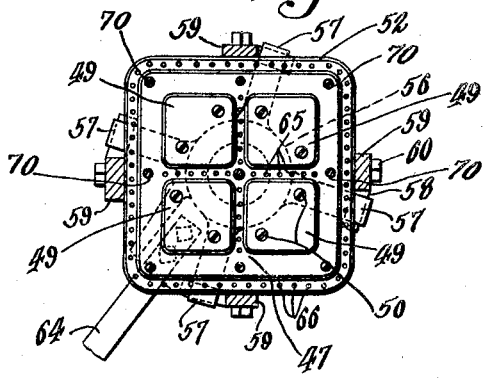
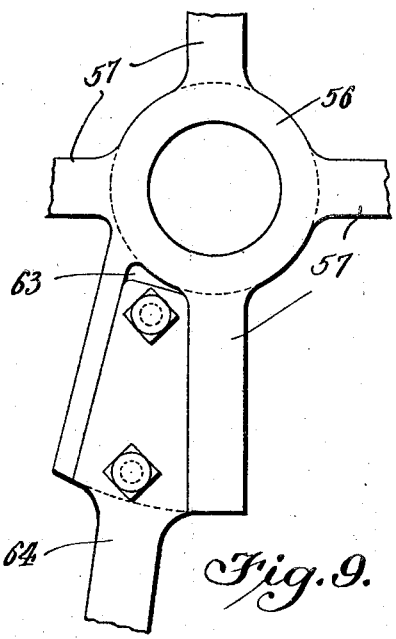

Patented Aug. 23, 1932

1,873,445

UNITED STATES PATENT OFFICE

WILLIAM McCLINTOCK AND ROY LACY, OF LOS ANGELES, CALIFORNIA, ASSIGNORS TO PACIFIC CLAY PRODUCTS, OF LOS ANGELES, CALIFORNIA, A CORPORATION OF CALIFORNIA

APPARATUS FOR MAKING INTERLOCKING MULTIPLE DUCT CONDUITS

Application filed August 2, 1929. Serial No. 383,131.

This invention relates to an apparatus particularly adapted to be used in the formation of multiple duct conduits provided with inter-engaging flanged ends, so that the adjoining pieces of conduit may be placed in alinement and in overlapping or jointed relation to each other. The invention particularly relates to an apparatus comprising a particular combination and arrangement of elements whereby an inter-engaging flanged conduit may be formed in a single operation.

More particularly, the invention relates to a die and to a former adapted to cooperate with said die and adapted to retard the flow of plastic material through portions of said die while permitting plastic material to flow through other predetermined portions of the die. Furthermore, the invention embraces an apparatus capable of retarding the flow of plastic material through portions of the die without causing cracks and unequal stresses to be set up in the finished product.

Heretofore, conduits made from clay by extrusion processes, and then burned, have been provided with flat plane ends. Such conduits could be placed in abutting relation to each other, but it has been impossible to make tight joints between such conduits, and very often the penetration of moisture impaired or destroyed the cables, wires and the like within such conduits. In order to make water-tight joints around abutting ends of adjoining conduits, it has been necessary to use rather complicated forms and collars. The use of such complicated forms can be obviated by the use of conduits made in accordance with this invention.

An object of this invention is to disclose and provide an apparatus for forming flanged multiple duct conduits. Another object is to disclose and provide an apparatus capable of forming a flanged conduit in a single extruding operation.

Another object is to disclose and provide an apparatus capable of retarding the flow of clay or other plastic material through portions thereof, while permitting clay or plastic material to be extruded and moulded in other portions so as to form a flanged or interlocking multiple duct conduit.

A still further object of this invention is to disclose and provide a new die and former cooperating therewith, said apparatus being capable of producing a multiple duct conduit provided with inter-engaging ends.

Other objects, uses and advantages of the apparatus described and embraced by this invention will become apparent to those skilled in the art from the following detailed description of a preferred form of construction and mode of operation. In describing the invention, reference will be had to the appended drawings, in which:

Fig. 1 is an end elevation of one form of conduit which may be made on the apparatus embraced by this invention.

Fig. 2 is a side perspective, partly broken away, of the conduit shown in Fig. 1.

Fig. 3 is a longitudinal section of the conduit shown in Fig. 1, said section being taken along the plane indicated by line 3—3, the conduit being shown in abutting relation with an adjoining conduit.

Fig. 4 is a longitudinal section of two interlocking conduits made in accordance with this invention and upon the apparatus disclosed hereinafter, a modified form of conduit being shown.

Fig. 5 is a diagrammatic representation of a general assembly including the apparatus embraced by this invention.

Fig. 8 is a plan view of the former and locking spider, the view being taken substantially along the plane 8—8 indicated in Fig. 7.

Fig. 9 is a detail, in plan, of a portion of the locking bar shown in dotted lines in Fig. 8.

Figure 6:
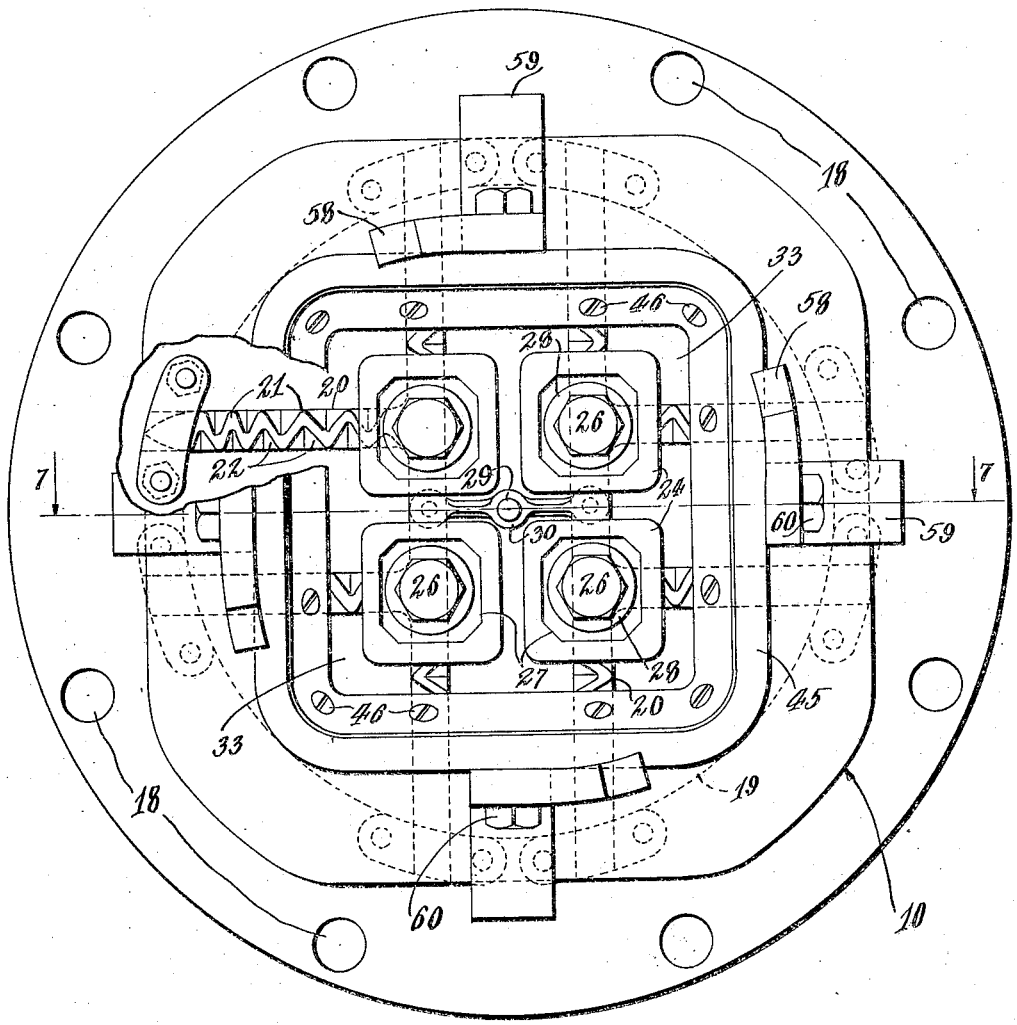
Fig. 6 is a bottom view, partly broken away, of the die included in the apparatus, the view being taken along line 6—6 indicated in Fig. 5.

In general the apparatus (shown in Fig. 5) includes a suitable cylinder 1 adapted to receive a plastic clay body or other plastic material capable of being extruded and formed into conduits. Means may be provided for filling the cylinder 1 with plastic material, such means for example, including a continuous conveyor 2 adapted to feed the plastic material from a suitable source into the cylinder 1 through a hopper or trough 3. A ram or pressure head 4 is preferably provided, said pressure head 4 being adapted to be slidably received in the cylinder 1.

Any suitable means for moving the pressure head 4 into and within the cylinder 1 may be provided. For example, as shown in the drawings, the pressure head 4 may be connected by means of piston rods 5 with a piston 6 within a steam cylinder 7, means being provided at 8 and 9 for introducing steam under pressure into the cylinder for moving the piston 6 therein. Necessarily, suitable valves and a source of steam under pressure needs be provided, although such means are not shown. Instead of using steam, the piston 6 or its equivalent may be operated by hydraulic means, the piston 6 being either directly connected to a pressure head 4 or through an intermediate guide or cross head.

The cylinder for plastic material 1, is preferably provided at its lower extremity with a die generally indicated at 10. Movably positioned beneath the die 10 is a former generally indicated at 11, said former 11 being movable along an axis extending centrally through the die 10 and cylinder 1. For example, the former 11 may be mounted upon a scale rod 12 suitably mounted in a bearing (not shown) at or below the floor level indicated at 13. The lower end of the scale rod 12 may be connected as shown at 14, with any suitable counter-balance or counter-balances. As shown in Fig. 5, the scale rod 12 may be counter-balanced by means of weights 15 attached by means of flexible cables 16 to the member 14, the cables 16 passing over pulleys 17.

The apparatus generally described hereinabove may be used in connection with any other suitable means, such as for example, means for automatically discontinuing the downward movement of the pressure head 4 when an article of desired length has been extruded from the die 10. One such apparatus is described in application Serial Number 231,557, of which William McClintock and Frank Y. Pearne are the inventors.

Figure 7:
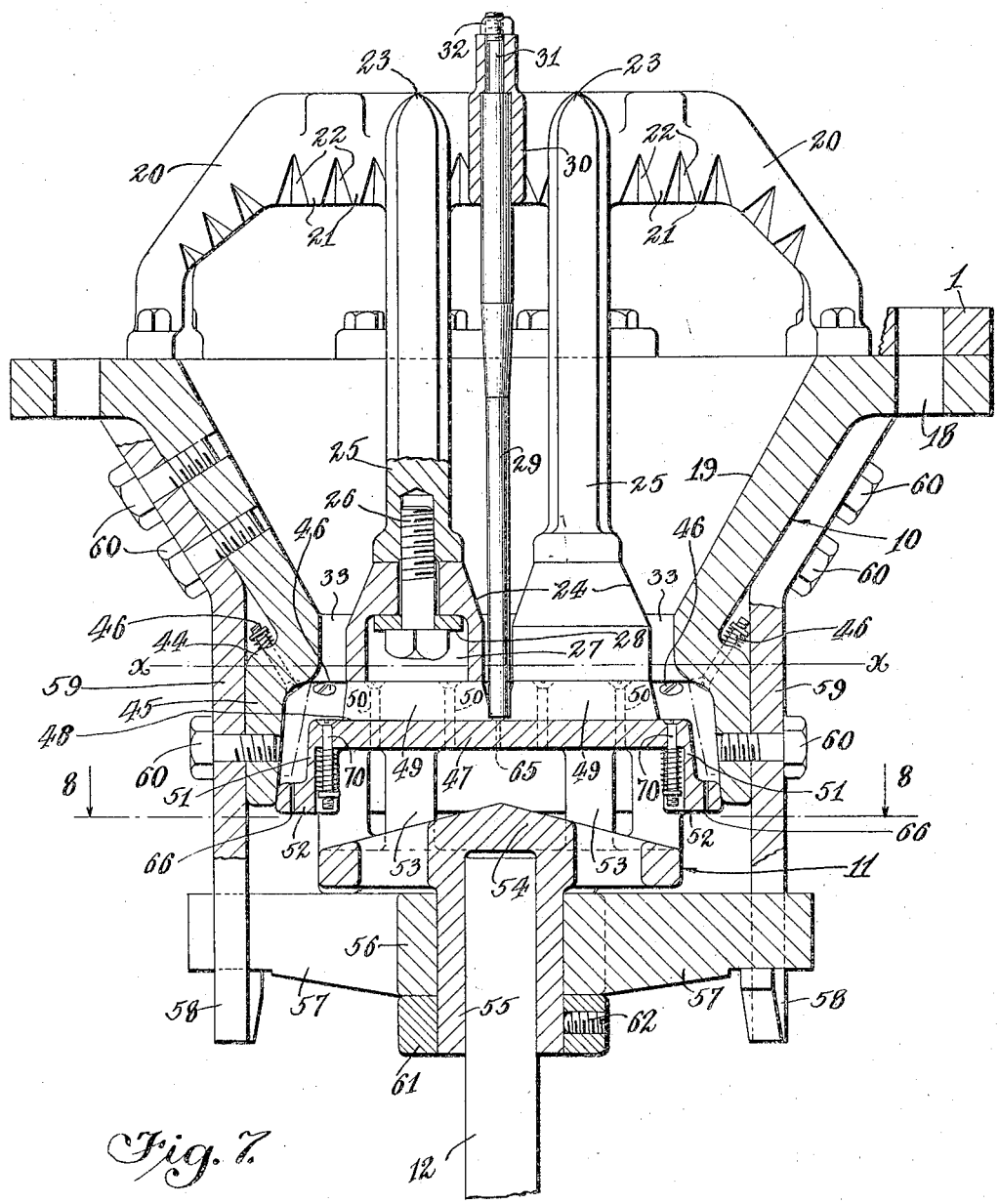
Fig. 7 is a vertical section of the apparatus shown in Figs. 5 and 6, the section being substantially along line 7—7 of Fig. 6.

The details of the die and former are shown in Figs. 6 and 7. The die 10 may be attached to the lower end of the cylinder 1 in any suitable manner, as by means of bolts passing through suitable apertures 18 in the upper flange of the die 10. Preferably, the walls 19 of the die 10 are conical in contour, inclining downwardly towards the center of the die. Furthermore, the die may be provided with one or more bridges 20 extending somewhat into the cylinder 1, said bridges being of elliptical cross section and preferably provided with a serrated lower edge, such edge being provided with alternate risers 21 and depressions 22 so as to form a serrated edge, as is indicated in Fig. 6. The upper edge of the bridge 20 may be pointed as is indicated at 23. This construction reduces the frictional resistance of the bridges against the clay being fed thereinto, and the staggered bottom edge construction obviates the formation of continuous straight cleavage lines in the extruded product.

Suspended from the main bridge or bridges 20 are core members 24, one of said core members 24 being provided for each duct which it is desired to form in the finished conduit. Inasmuch as the dies shown for illustrative purposes in the drawings are adapted for use in the manufacture of a four-way conduit, four of said cores 24 are shown. The cores 24 may be connected to the bridge 20 by means of members 25, said members 25 being preferably formed integrally with the bridge 20.

The cores 24 may be connected to the members 25 in any suitable manner, as for example, by means of machine screws 26 in threaded engagement with the lower ends of members 25, the lower ends of cores 24 being hollow as indicated at 27, so as to accommodate the head of the machine screw 26 and a suitable washer 28. The upper walls of the cores 24 are preferably tapered outwardly, as shown in Fig. 7, so as to guide the plastic material into the apertures separating said cores from each other in the working plane X—X indicated in Fig. 7, and into the apertures between said cores 24 and the exterior walls of the die 10.

Very often it is desirable that a peg-hole be formed in the conduit centrally thereof, and in order to produce such a peg-hole in the finished product a member 29 is preferably suspended from the bridge 20 in a suitable position.

The cylindrical member 29 may be adapted to fit into a socket formed in a boss 30 in the bridge 20, the member 29 being provided with a threaded shank 31 of smaller diameter than the main body of the member 29 within the socket 30, so as to permit the attachment of the member 29 by means of a nut 32 to the bridge 20.

At the working plane X—X, shown in Fig. 7, clay or other plastic material will be extruded from the die through the external openings 33 and through the openings between the core members 24. The openings 33 form the exterior wall of the finished conduit, and a die made as described hereinabove would produce a standard conduit with a plane end. Instead of forming a conduit of ordinary construction, it is desired to disclose and provide a machine capable of producing a flanged conduit provided with an end adapted to interlock with an abutting section. Two forms of conduits, among others which may be made in an apparatus of the character described hereinafter, are shown in Figs. 1 to 4. As indicated in these drawings, the conduit may comprise an exterior wall 34 in either rectangular or square form, the interior thereof being divided longitudinally by a plurality of partitions or webs such as the webs 35 and 36. For purposes of illustration, a four-way conduit has been shown comprising the ducts 37, 38, 39 and 40 separated by the webs 35 and 36. A peg-hole 41 is shown centrally of the four ducts.

It is to be understood that the invention is not limited to an apparatus capable of manufacturing a four-way conduit described herein, but may be modified so as to produce two-way, four-way, six, nine or twelve-way conduits. Preferably, the conduits made in accordance with this invention include a lip 42 protruding longitudinally of the conduit beyond the plane of the webs 35 and 36. By the plane of the web is meant the meeting plane as illustrated in Figs. 3 and 4.

In Fig. 3, the lip 42 is adapted to engage with the exterior of an abutting conduit wall 34', said lip 42 being a continuation of an outwardly extending flange 43. In Fig. 4 the lip 42 is a longitudinal extension of a part of the wall 34, said lip 42 being adapted to engage with an external groove formed in the opposed end of an abutting conduit wall 34'.

The apparatus adapted to produce a conduit of the character described comprises an outwardly extending flange 44, on the lower portion of the die 10, said outwardly extending flange 44 terminating in a downwardly extending lip 45. Air inlet valves 46 of suitable construction are preferably positioned in the corner of the die thus formed, that is, in the corner formed by the flange 44 and the lip 45, said valves 46 being in spaced relation and number, their spacing depending somewhat upon the consistency and character of the plastic material being used.

When clay is employed the valves may be spaced a distance of from two to three inches around the periphery of the die. It is to be noticed that the flange 44 and the downwardly extending lip 45 extend below the normal working plane X—X of the die and below the plane at which the cores 24 terminate.

The former 11 mentioned hereinabove preferably comprises a plate 47 adapted to present a working face 48 substantially transverse to the longitudinal axis of the cylinder 1, and the flow of plastic material through the die described hereinabove. The area of the working face 48 of the plate 47 is preferably equal to or slightly greater than the total area of the aperture in the die. This is particularly true when a conduit such as is illustrated in Figs. 1 to 3 is to be produced.

The plate 47 preferably carries thereon a plurality of core members 49, said core members 49 being slightly pyramidal in form and adapted to come into abutting relation with the lower ends of cores 24 suspended in the die 10. The core members 49 may be attached to the former plate 47 in any suitable manner, as by means of machine screws 50, or they may be cast integrally therewith. The former plate 47 may also be provided with a downwardly extending lip 51 and an outwardly extending flange 52, said flange 52 being adapted to come into abutting relation with the lip 45 of the die 10. In this manner a passage-way 33a is formed between the lip 51 and the lip 45, said passage-way 33a being adapted to form a lip 42 of the resulting conduit.

The former plate 47 is preferably maintained in spaced relation as by means of columns 53 from a conical base 54, the base 54, columns 53 and former plate 47 being preferably formed integrally with each other. The conical base 54 is preferably provided with a sleeve or socket 55 adapted to receive the scale rod or equivalent means 12. Rotatably mounted upon the sleeve 55 is a spider 56 provided with arms 57, said arms 57 being adapted to cooperate with hook members 58 whose shanks 59 may be attached to the die 10 as by means of machine screws 60. When the arms 57 of the spider 56 are in engagement with the hook members 58, then the former plate and particularly the core members 49 and flange 52 thereof, are in abutting relation with the core members 24 and flange 45 of the die 10. Excessive vertical motion of the spider 56 upon the sleeve 55 may be prevented by means of a collar 61 carried by the sleeve 55 and firmly attached thereto as by means of a set screw 62. As shown in Figs. 8 and 9, the spider 56 may be provided with a recess or socket 63 adapted to receive a handle 64, said handle being employed in rotating the spider 56 and causing the arms 57 thereof to engage with or disengage the hook members 58.

At the beginning of an extrusion operation, the former 11 is moved into contact with the die 10 and the spider 56 partially rotated, so as to cause the arms 57 to engage with the hook members 58. Plastic material in the cylinder 1 is then compressed by operation of the ram or piston 6, so as to compress said plastic material in the cylinder 1 and cause the same to flow out of the die 10 through the passage-ways 33 and the passage-ways between the core members 24.

The plastic material will be extruded from the die 10 until the wall of clay meets the former plate 47. The plastic material extruded through the openings between the core members 24 will occupy the opening between the core members 49, but will be stopped thereafter by the plate 47. In order to prevent the plastic material from being subjected to too great a pressure between the core members 49, a plurality of spaced apertures 65 are formed in the former plate 47 between the core members 49, said apertures 65 communicating with the opening between the former 47 and the conical base 54. These apertures 65 may be of very small diameter, say $\frac{1}{16}$ or $\frac{3}{32}$ of an inch. Excessive pressure developed in the plastic material can thus be relieved through the apertures 65, a small quantity of the plastic material being extruded through the apertures 65 into the opening between the former plate 47 and the conical base 54, said extruded clay then being discharged from the former between the pillars or columns 53.

The wall of plastic material extruded through the openings 33 comes in contact with the surface 48 of the former plate 47, and is deflected into the opening 33a between the lip 45 and the lip 51. While the plastic material is moving into the opening 33a, it is being restrained from longitudinal movement between the core members 49 by the former plate 47.

As soon as the opening 33a has been completely filled with plastic material, the spider 56 may be partially rotated so as to divorce the arms 57 from the hooks 58, thereby permitting the former 11 to move downwardly under the pressure of the clay or other plastic material being extruded through the die 10. In order to indicate when the chamber 33a has been completely filled with plastic material, minute apertures 66 may be provided in the edge or flange 57 of the former plate 47.

It is to be understood that the former 11, together with its appurtenances, is so counterbalanced by the weights 15 (as shown in Fig. 5) that only a very nominal pressure needs be exerted downwardly upon the former (after the arms 57 are disengaged from the hooks 58) in order to move the former downwardly.

When the former 11 is first released by disengagement of the arms 57, there may be a tendency for the plastic material in the aperture 33a and between the lips 51 and 45 to adhere to the sides of the die, and particularly to the corner formed by the flange 44 and the lip 45. For this reason, air inlet valves 46 have been provided in the recess thus formed, said valves admitting air to the recess as the former begins to move downwardly out of contact with the die. Thus, any suction which may be established by the intimate contact of the plastic material with the sides of the die, and particularly with the sides of the flange 44 and lip 45, is broken and the formed extruded product moved downwardly.

In order to assist in the removal of the formed or extruded conduit from the former plate 47, a plurality of air valves 70 may be positioned in the face 48 of the former plate 47 exteriorly of the core members 49 attached to the plate 47. Any suction which may exist between the molded body resting on the former can thus be broken when the formed product is removed from the former, the valves 70 admitting air to the surface of the plate 47. As shown in Figure 8, a plurality of valves 70 may be used spaced from each other, the number of said valves depending upon the consistency and adhesive characteristics of the material being used in the formation of the products.

It is to be understood that although a particular apparatus has been described in detail, such description has been made only for purposes of illustration, and the invention is not limited to the specific detailed description hereinabove, nor the particular combination and arrangement of elements shown and described herein, but includes all such changes and modifications as come within the scope of the appended claims.

What we claim is:

1. A former for use in making interlocking multiple duct conduits comprising a former plate, a plurality of core members attached to said plate in spaced relation and spaced from the edge of said plate, a flange peripherally extending from said former plate, spaced air inlet valves in the edge of said former plate, and a lip extending in a plane parallel to the plane of the former plate extending from said flange, said lip containing a plurality of spaced apertures.

2. In an apparatus for making interlocking multiple duct conduits, a former comprising a former plate having an area substantially equivalent to the cross section of the article to be produced thereon, aligned perforations in said former plate, said perforations being in alignment with web portions of a multiple duct conduit to be formed thereon, a plurality of spaced air valves along the edge of said former in substantial alignment with the walls of a conduit to be formed thereon.

3. In an apparatus for making interlocking, multiple duct conduits, a former comprising a former plate of dimensions slightly exceeding the cross-sectional dimensions of the multiple duct conduit to be produced thereon, aligned perforations in said former plate, said perforations being in alignment with web portions of a multiple duct conduit to be formed thereon, a lip peripherally extending from said former plate, and a flange extending from said lip in a plane parallel to the plane of the former plate, said flange containing a plurality of spaced apertures.

4. In an apparatus for making interlocking, multiple duct conduits, a former comprising a former plate of dimensions slightly exceeding the cross-sectional dimensions of the multiple duct conduit to be produced thereon, aligned perforations in said former plate, said perforations being in alignment with web portions of a multiple duct conduit to be formed thereon, spaced air inlet valves in the edge of said former plate, a lip peripherally extending from said former plate, and a flange extending from said lip in a plane parallel to the plane of the former plate, said flange containing a plurality of spaced apertures.

5. In an apparatus for making interlocking, multiple duct conduits, a former comprising a former plate of dimensions slightly exceeding the cross-sectional dimensions of the multiple duct conduit to be made thereon, a plurality of core members attached to said plate in spaced relation and spaced from the edge of said plate, aligned perforations in said former plate between said core members, said perforations being in alignment with web portions of a multiple duct conduit to be formed on said former, a lip peripherally extending from said former plate, and a flange extending from said lip in a plane substantially parallel to the plane of the former plate.

6. In an apparatus for making interlocking, multiple duct conduits, a former comprising a former plate of dimensions slightly exceeding the cross-sectional dimensions of the multiple duct conduit to be made thereon, a plurality of core members attached to said plate in spaced relation and spaced from the edge of said plate, aligned perforations in said former plate between said core members, said perforations being in alignment with web portions of a multiple duct conduit to be formed on said former, a plurality of spaced air inlet valves along the edge of said former plate in substantial alignment with the walls of a conduit to be formed thereon, a lip peripherally extending from said former plate, and a flange extending from said lip in a plane substantially parallel to the plane of the former plate.

7. In an apparatus for making interlocking, multiple duct conduits, a former comprising a former plate of dimensions slightly exceeding the cross-sectional dimensions of the multiple duct conduit to be made thereon, a plurality of core members attached to said plate in spaced relation and spaced from the edge of said plate, aligned perforations in said former plate between said core members, said perforations being in alignment with web portions of a multiple duct conduit to be formed on said former, a plurality of spaced air inlet valves along the edge of said former plate in substantial alignment with the walls of a conduit to be formed thereon, a lip peripherally extending from said former plate, and a flange extending from said lip in a plane substantially parallel to the plane of the former plate, said flange being provided with a plurality of spaced apertures.

Signed at Los Angeles, Calif., this 17th day of July, 1929.

WILLIAM McCLINTOCK.
ROY LACY.